(12) United States Patent
Kippe et al.

(10) Patent No.: US 6,257,287 B1
(45) Date of Patent: Jul. 10, 2001

(54) FUEL FILL PIPE SHUT-OFF DEVICE

(75) Inventors: Bradley N. Kippe, Holly; Emil Szlaga, Sterling Heights, both of MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/457,879

(22) Filed: Dec. 10, 1999

(51) Int. Cl.[7] ............................. B65B 1/30; B65B 3/28; B65B 57/06; B65B 57/14; B67C 3/00
(52) U.S. Cl. ............................. 141/198; 141/4; 141/5; 141/192; 141/285; 141/301; 220/86.2; 220/86.3; 137/202; 137/391; 137/395; 137/398; 137/410
(58) Field of Search ........................... 141/4, 5, 192, 141/197, 198, 285, 301, 302, 311 R, 325; 220/86.2, 86.3; 137/43, 202, 386, 391, 395, 398, 409, 410, 411

(56) References Cited

U.S. PATENT DOCUMENTS

| 2,491,521 | 12/1949 | Samiran | 137/104 |
|---|---|---|---|
| 2,849,019 | 8/1958 | Oliveau et al. | 137/391 |
| 2,855,949 | 10/1958 | Sterner et al. | 137/414 |
| 2,861,583 | 11/1958 | Colliver | 137/39 |
| 3,603,342 | 9/1971 | Bottoms | 137/414 |
| 3,929,155 | 12/1975 | Garretson | 137/430 |
| 4,305,422 | 12/1981 | Bannink | 137/415 |
| 5,529,086 | 6/1996 | Kasugai et al. | 137/202 |
| 5,577,526 | 11/1996 | Kasugai et al. | 137/202 |

*Primary Examiner*—Timothy L. Maust

(57) ABSTRACT

A motor vehicle fuel fill pipe shut-off device includes a fuel shut-off valve normally closed relative to a valve seat and disposed in a path of fuel flow through the fuel fill pipe of the motor vehicle to a fuel tank thereof. The valve is connected to a diaphragm in a manner to define in part a chamber communicated by an inlet orifice to the fuel fill pipe and by an outlet orifice to the fuel tank that is vented during fueling to a charcoal canister wherein a fluid pressure in the chamber is lower than that in the fuel fill pipe during fueling to permit opening of the valve by fuel introduced through the fuel fill pipe, A fuel float or solenoid moves a closure to close off communication of the outlet orifice to the fuel tank when fuel level in the fuel tank reaches the predetermined "full" level to increase chamber fluid pressure to permit movement of the valve by a biasing spring as assisted by the diaphragm toward the valve seat and achieve closing of the valve to prevent further filling of the fuel tank with fuel.

14 Claims, 10 Drawing Sheets

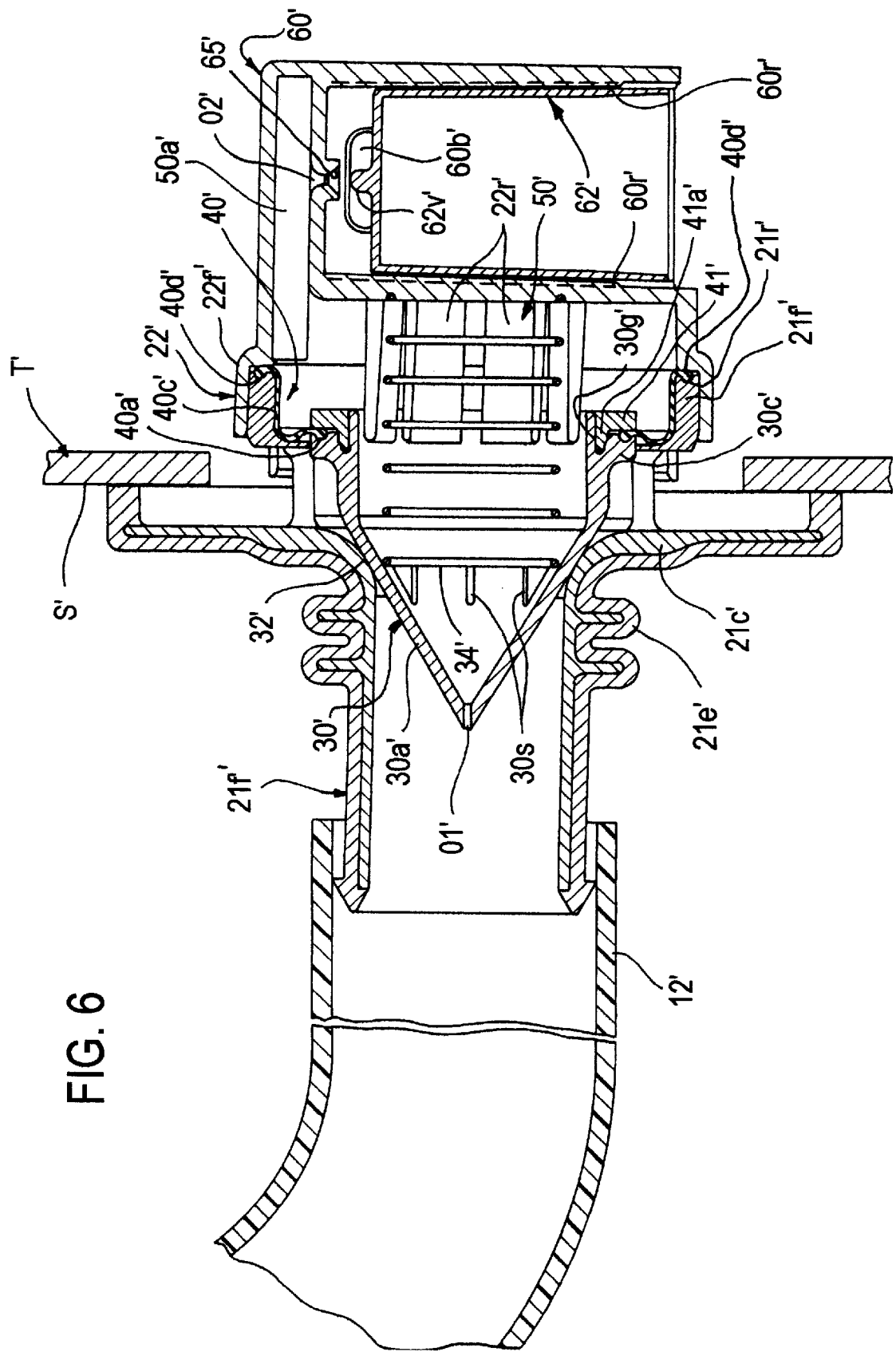

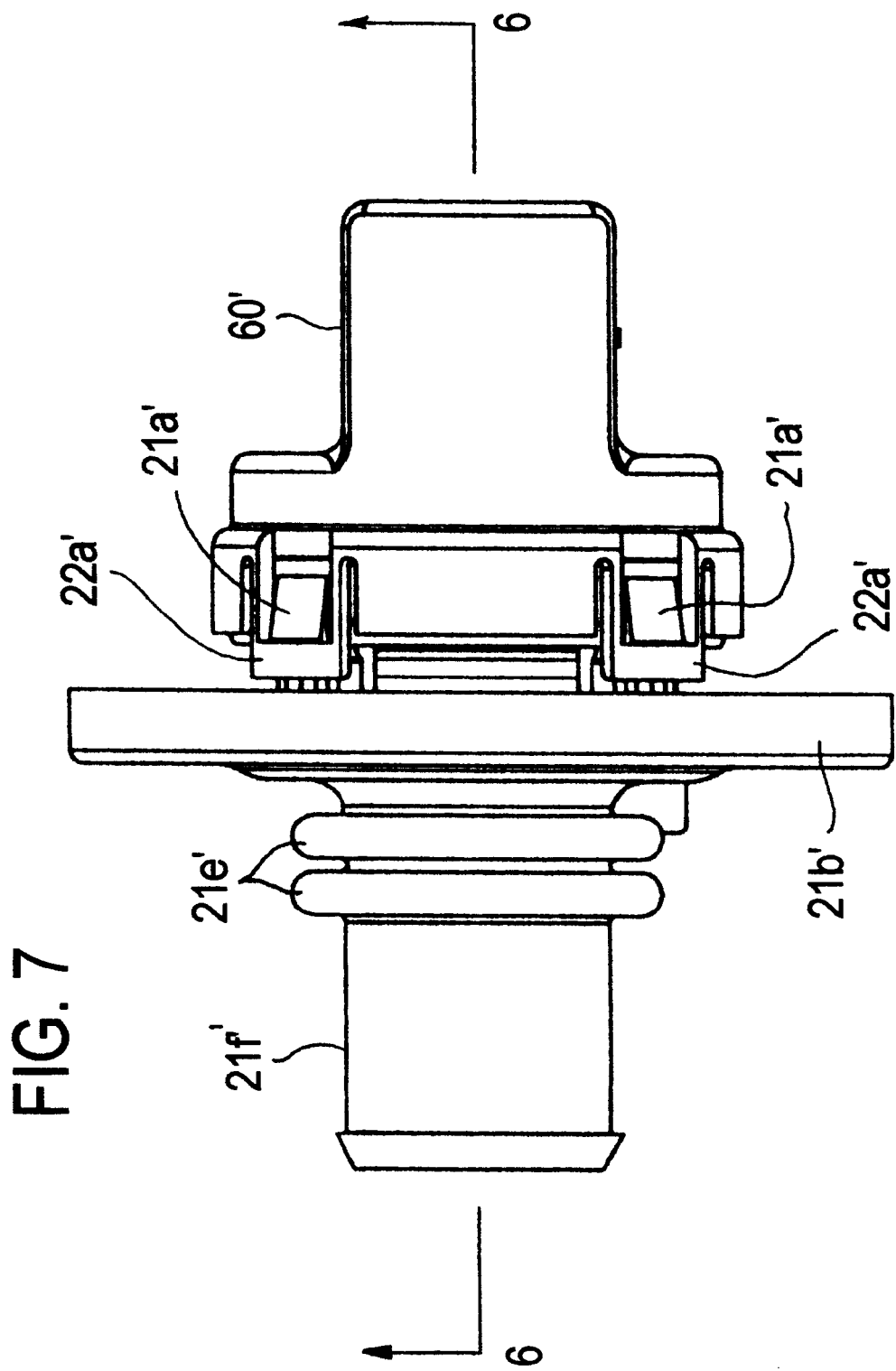

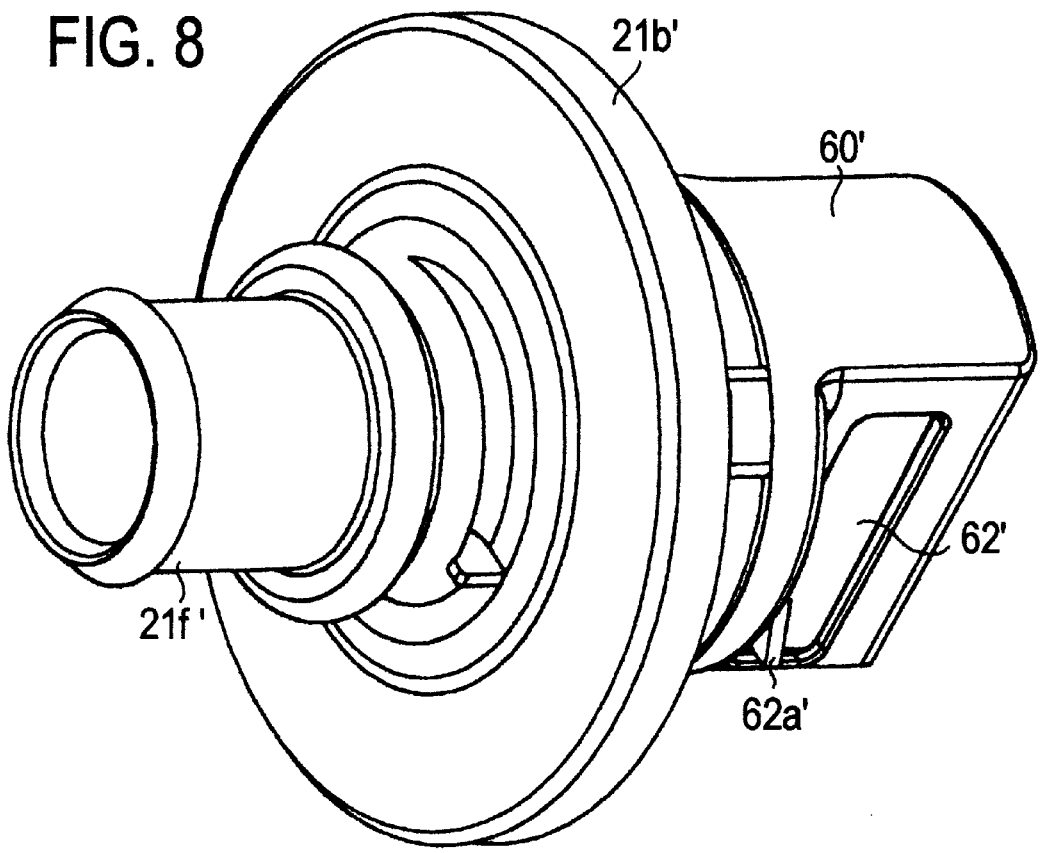

FUEL FILL PIPE SHUT-OFF DEVICE

FIELD OF THE INVENTION

The present invention relates to a vehicle fuel fill pipe shutoff device operable to close off fuel flow through a fuel fill pipe when fuel level in a fuel tank reaches a predetermined level (design "full" level).

BACKGROUND OF THE INVENTION

Motor vehicles today include a filler tube or pipe communicated to the fuel tank for filling the tank with fuel and means for controlling the level of fuel in the tank during refueling to a predetermined level (design "full" level). Commonly used fuel level control systems control venting of fuel vapor from the fuel tank during refueling using one or more vapor venting valves (e.g. a rollover valve and/or a vapor vent valve to a charcoal fuel vapor storage canister, etc.) to control a fuel "full" level. Closure of the fuel vapor venting path(s) from the fuel tank results in liquid fuel backing up in the fuel fill pipe to shut-off the fuel dispensing nozzle inserted into the fuel pipe.

An object of the present invention is to provide a vehicle fuel fill pipe shut-off device operable to directly close off fuel flow through a fuel fill pipe when fuel level in the fuel tank reaches a predetermined level.

SUMMARY OF THE INVENTION

The present invention provides a fuel fill pipe shut-off device disposed in the path of fuel flow through a fuel fill pipe of a motor vehicle to a fuel tank to close off fuel flow to the fuel tank when fuel level therein reaches a predetermined level (e.g. a design "full" level).

In an illustrative embodiment of the present invention, the vehicle fuel fill pipe shut-off device includes a fuel shut-off valve normally closed relative to a valve seat and disposed in a path of fuel flow through the fuel fill pipe to the fuel tank. The fuel shut-off valve is connected to a diaphragm in a manner to in part define a chamber having an inlet communicated to the fuel fill pipe and an outlet communicated to the fuel tank vented to a fuel vapor storage canister during fueling in a manner that, during fueling, the valve is opened by the liquid fuel introduced through the fuel fill pipe as a result of fluid pressure in the chamber being less than fluid pressure in the fuel fill pipe. A closure is provided for interrupting communication between the outlet of the chamber and the fuel tank when the fuel level in the fuel tank reaches the predetermined level (e.g. design "full" level) so that fluid pressure in the chamber can build up to permit valve movement toward the valve seat and achieve closing thereof to prevent further filling the fuel tank with fuel. The closure may comprise a fuel float with a closure valve, a solenoid actuated closure valve, and other suitable closure valve to interrupt communication between the outlet of the chamber and the interior of the fuel tank when the fuel level in the fuel tank reaches the predetermined level (e.g. design "full" level).

In a particular illustrative embodiment of the invention, the chamber includes an inlet orifice disposed on the shut-off valve and communicated to the fill pipe and an outlet orifice disposed on a diaphragm housing and communicated to the fuel tank with the outlet orifice being larger in size than the inlet orifice such that chamber fluid pressure is lower than that in the fuel fill piping prior to the fuel reaching a predetermined fuel "full" level. A fuel float is provided relative to the diaphragm housing and responsive to fuel level in the fuel tank to close off the outlet orifice of the chamber when fuel level in the fuel tank reaches the predetermined "full" level. The chamber fluid pressure then can build up to permit movement of the fuel shut-off valve in a closure direction toward the valve seat by a valve biasing spring as assisted by the diaphragm to achieve valve closing to prevent further filling of the fuel tank with fuel. The design "full" fuel level in the fuel tank is thereby controlled pursuant to an embodiment of the invention.

The present invention may be better understood when considered in view of the following detailed description of illustrative embodiments taken with the following drawings.

DESCRIPTION OF THE DRAWINGS

FIG. 6 is a longitudinal sectional view of a fuel fill pipe shut-off device taken along lines 6—6 of FIG. 7 pursuant to another embodiment of the invention with the shut-off valve closed.

FIG. 7 is an elevational view of the fuel fill pipe shut-off device of FIG. 6.

FIG. 8 is a perspective view of the fuel fill pipe shut-off device of FIG. 6.

DESCRIPTION OF THE INVENTION

Figure 1:
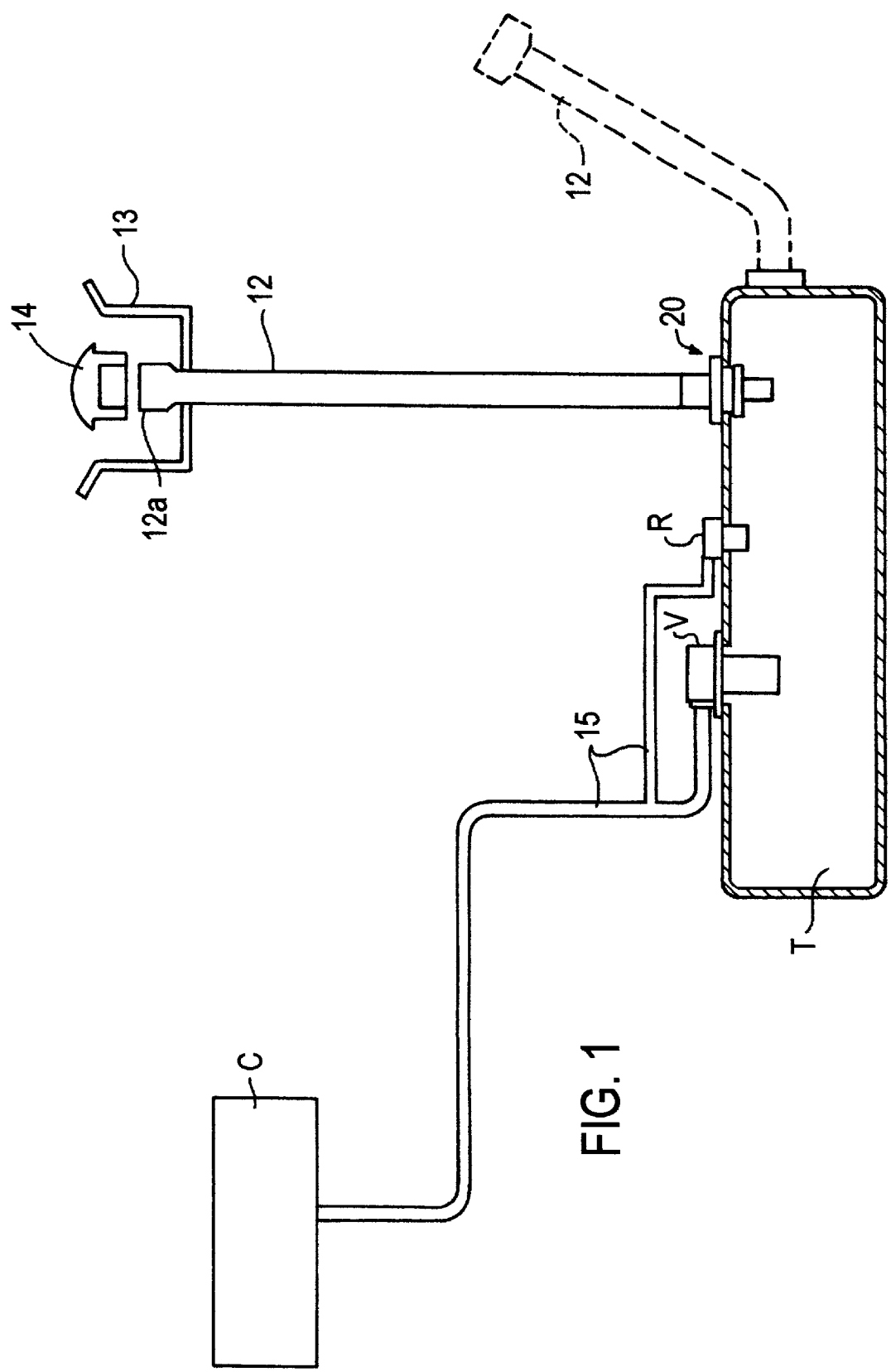
FIG. 1 is a schematic view of a vehicle fuel system having a fuel tank connected to a fuel filler pipe.
Figure 2:
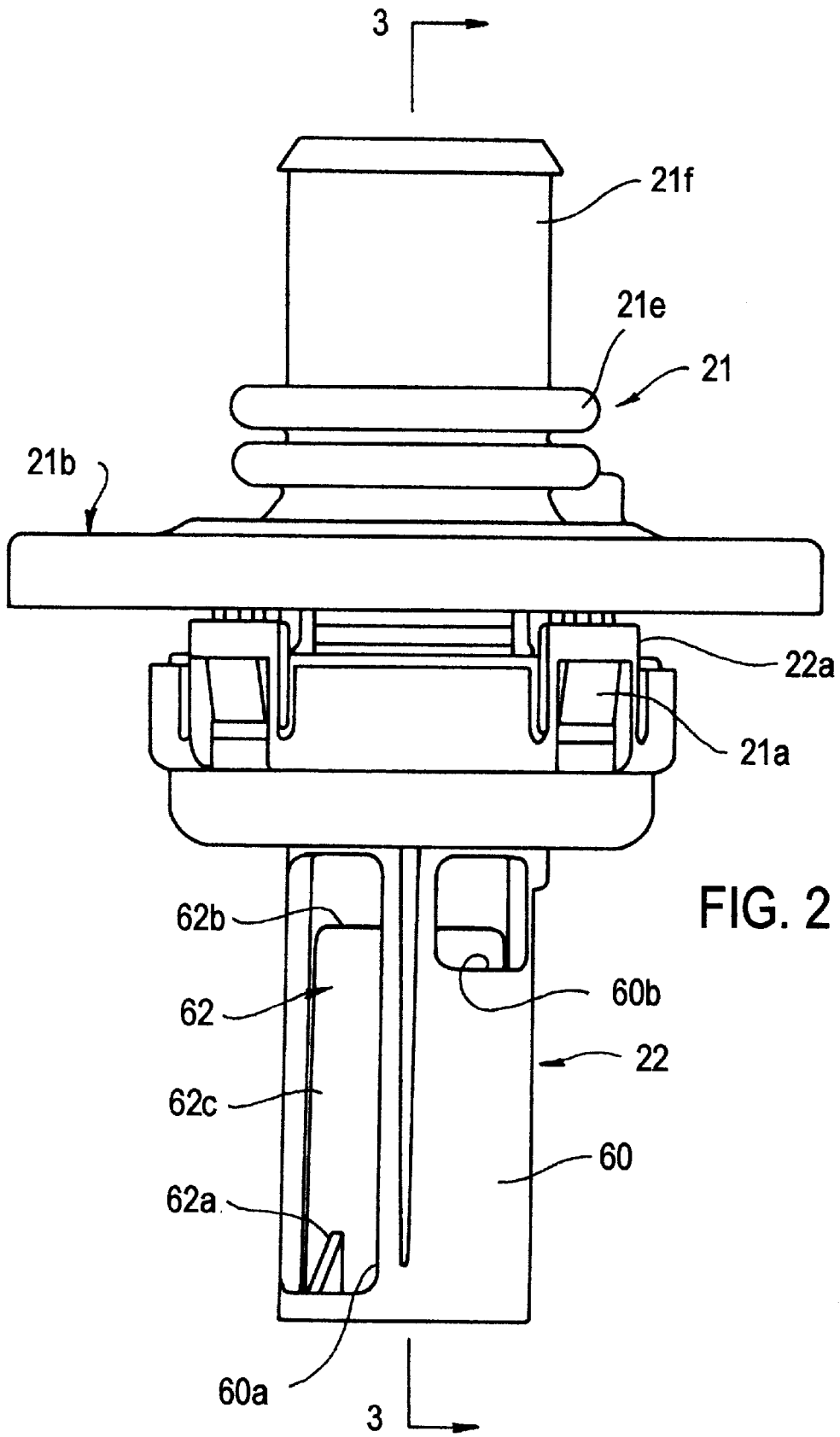
FIG. 2 is an elevational view of a fuel fill pipe shut-off device pursuant to an embodiment of the invention.
Figure 3:
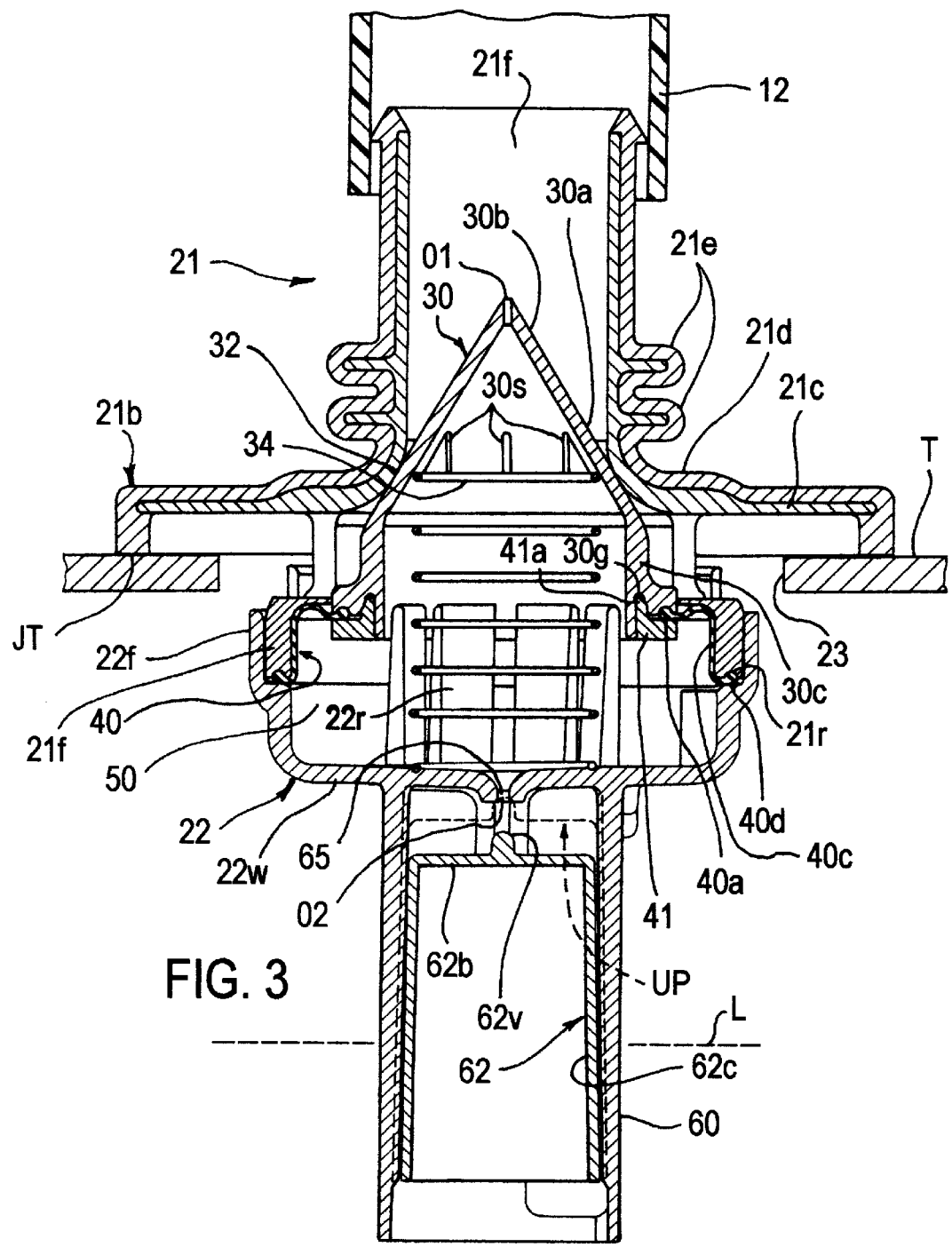
FIG. 3 is a longitudinal sectional view along lines 3—3 of FIG. 2 with a shut-off valve closed without fuel entering the fill pipe.

Referring to FIGS. 1 and 2, a motor vehicle, such as an automobile, van, truck and the like, is shown having a fuel tank T connected to a fuel fill pipe 12 that is closed off by a filler cap 14. The fill pipe 12 includes an open end 12a that is connected to a conventional bracket 13 fastened or part of the motor vehicle body and on which the filler cap 14 is disposed in conventional manner to close off the end 12a after filling of the tank T with fuel, such as gasoline. The fuel tank T typically includes a conventional rollover valve R and vapor venting valve V both communicated by conduits 15 to a conventional fuel vapor storage canister C (e.g. charcoal canister) for venting fuel vapors to the canister.

The present invention provides in one illustrative embodiment a a vehicle fuel fill pipe shut-off device 20 in the path of fuel flow through the fuel fill pipe 12. The device 20 is received in an opening 23 in the top or side of the fuel tank T and comprises first and second housings 21, 22 connected together by, for example only, snap fit tabs 21a on upper housing 21 received in snap-fit relation in loops 22a of second lower housing 22. A plurality (e.g. 4) of circumferentially spaced apart tabs 21a and loops 22a are provided about the housings 21, 22 to this end.

The first housing 21 includes a laterally extending flange 21b that is welded or otherwise sealably fastened to the top of the fuel tank T at joint JT. The fuel tank typically is made of a suitable plastic material to this end or other material. The housing 21 can comprise an inner plastic (e.g. nylon or acetal) housing section 21c and outer plastic housing section 21d with the outer housing section 21d being made of a material (e.g. high density polyethylene or acetal) that is weldable to the top of the plastic fuel tank T to provide welded joint JT. The outer housing section 21d typically is over-molded on the inner housing section 21c. The inner and outer housing sections 21c and 21d are molded to have convolutions 21e to provide a fuel leakage resistant path therebetween against fuel leakage via opening 23 in the top of the fuel tank T.

The first housing 21 includes a fuel pipe connection 21f that is flared at its ends as shown and sealably received in the fuel fill pipe 12 of the motor vehicle. A conventional screw clamp (not shown) may be disposed about the fill piping 12 and flared end of the connection 21f.

The fuel shut-off device 20 comprises a plastic fuel shut-off valve 30 that is normally closed by a biasing compression spring 34 relative to a valve seat 32 formed by an inner wall of the fuel pipe housing 21c when no liquid fuel is flowing through fuel fill pipe 12.

Figure 4:
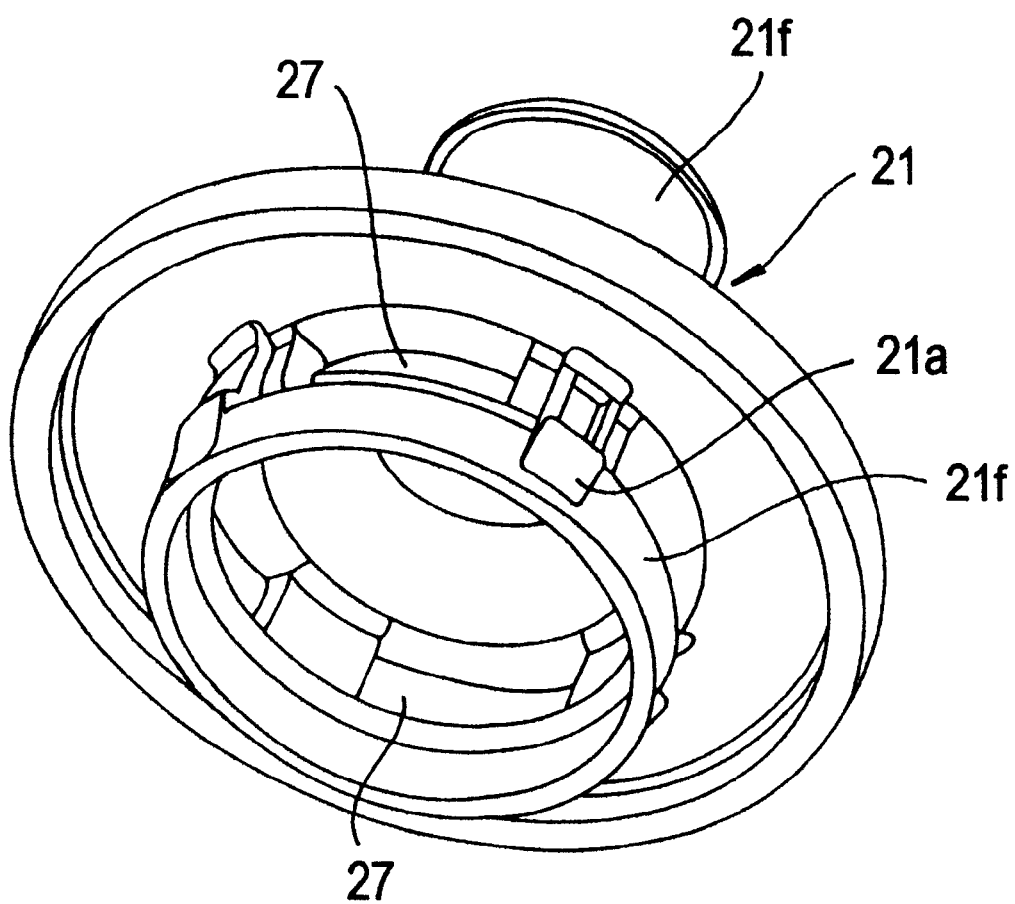
FIG. 4 is a perspective view of the upper housing of the shut-off device of FIG. 2.

However, when liquid fuel is flowing from a conventional fuel supply nozzle (not shown, inserted into fuel fill pipe 12) through fill pipe open end 12a during fueling to fill the fuel tank T, the fuel shut-off device 20 is provided for opening of shut-off valve 30 to permit liquid fuel to flow through the fuel fill pipe 12, fuel pipe connection 21f and then through openings 27, FIG. 4, between the snap-fit tabs 21a/loops 22a of housings 21/22 into the fuel tank T so long as the level of fuel in the tank T is below the predetermined (design "full") level L. When the fuel level in the tank T reaches a predetermined "full" level L, the fuel shut-off device 20 provides for closing of shut-off valve 30 to prevent further liquid fuel from flowing to the fuel tank T, thereby controlling the design fuel "full" level in the fuel tank.

To this end, the fuel shut-off valve 30 is disposed in the path of fuel flow through fuel fill pipe 12 and fuel pipe connection 21f to fuel tank T and includes an intermediate conical exterior sealing surface 30a that seals against the valve seat 32. The valve closure spring 34 is disposed between the second housing 22 and a plurality (e.g. 6) of inner, circumferentially spaced apart triangular shoulders 30s molded on the inner wall of the valve 30. The bottom of housing 22 includes integrally molded upstanding spring guide ribs 22r for positioning spring 34.

The fuel shut-off valve 30 has a conical configuration with an apex 30b and base region 30c. A flexible inverted cup-shaped rolling diaphragm 40 is connected to base region 30c of the conical valve configuration remote from the apex region 30b of the valve configuration. In particular, the flexible diaphragm 40 includes an upper circular periphery at one axial end defined by a first circular sealing bead 40a that is mechanically sealingly clamped to the valve base region 30c as shown by a plastic retainer 41 having annular tab 41a snap-fit in annular groove 30g on the axial end wall of the fuel shut-off valve 30. The diaphragm sealing bead 40a thereby is clamped (or otherwise connected) in a fuel tight seal relation between the valve base region 30c and the retainer 41.

The flexible rolling diaphragm 40 includes an axially extending upstanding wall 40c connecting the sealing bead 40a and a lower circular periphery defined by a circular sealing bead 40d. The lower sealing bead 40d is mechanically clamped between the first and second housings 21 and 22 that are snap-fit or otherwise connected together. In particular, inner housing section 21c includes a depending annular flange 21f nested in upstanding annular flange 22f of the second housing 22. Sealing bead 40d is received in an annular recess 21r between the facing axial ends of flanges 21f, 22f with the recess 21r sealingly receiving the sealing bead 40d of the diaphragm when the housings 21, 22 are joined together. The diaphragm 40 is made of a fuel-resistant flexible sheet (e.g. flurosilicone sheet having a nominal thickness of 0.34 inch) or other suitable flexible sheet material.

The effective area of the rolling diaphragm 40 is greater than the area where sealing surface 30a and valve seat 32 are in sealing relation such that there is a mechanical advantage provided by diaphragm 40 to assist spring 34 to close valve 30 when fuel level reaches the design "full" level as described below.

A chamber 50 is defined between the fuel shut-off valve 30/diaphragm 40 and the housing 22. The chamber 50 is communicated (vented) to the fuel fill pipe 12 by a first inlet orifice O1 in the apex 30b of the fuel shut-off valve 30 and to fuel tank T by a second outlet or exit orifice O2 in the lateral wall 22w of housing 22 connected to annular flange 22f. The outlet orifice O2 is larger in cross-sectional dimension than the inlet orifice O1 such that fluid pressure is lower in chamber 50 than the fluid pressure in the fuel fill pipe 12 prior to the fuel reaching the predetermined fuel "full" level as a result of the orifice O2 being larger in size than the orifice O1 during fueling prior to reaching the predetermined fuel "full" level L. In particular, during fueling prior to reaching the predetermined fuel "full" level L in the fuel tank T, the outlet orifice O2 is open and vented to the fuel tank T that is at a lower fluid pressure than the fluid pressure in the fuel fill piping 12 as a result of the fuel vapor in tank being vented to the charcoal canister C through conduits 15 via vapor venting valves V and rollover valve R, which may remain open for vapor venting purposes after the design fuel "full" level is reached. For purposes of illustration only, the orifice O1 can have a diameter of 1.0 millimeter, while the orifice O2 can have a minimum diameter of 1.5 millimeters.

Figure 5A:
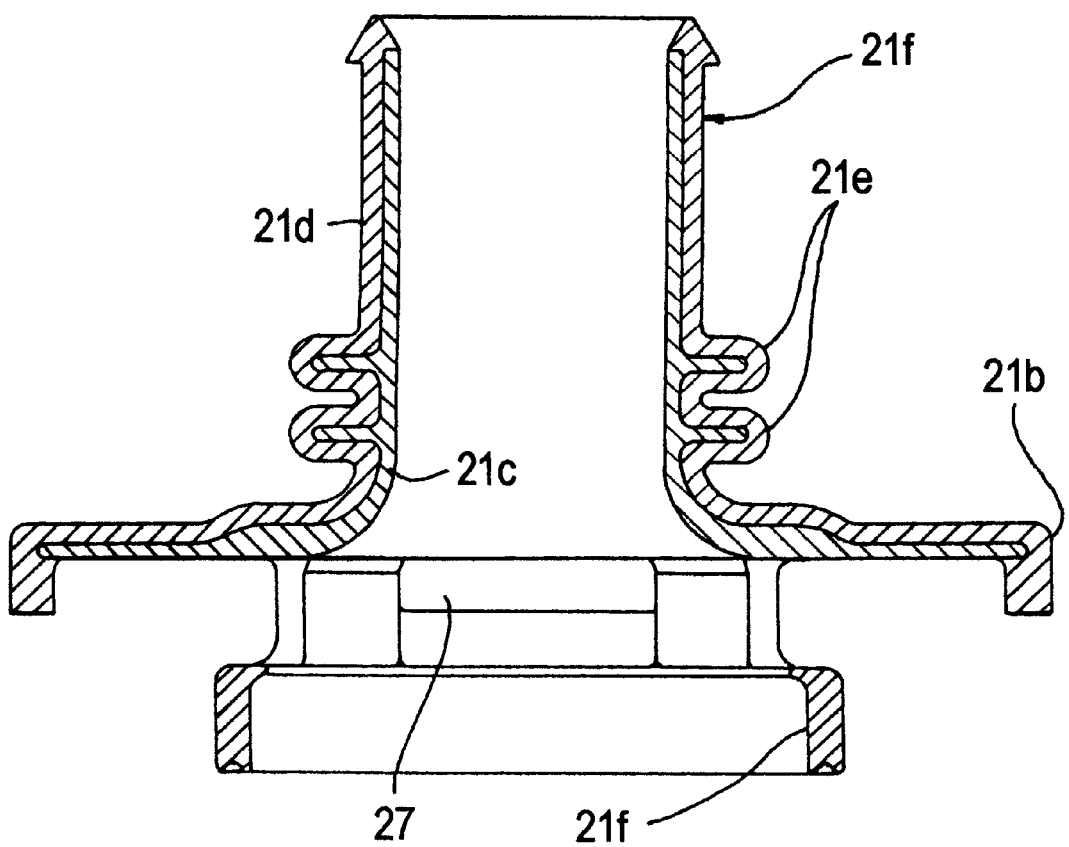
FIGS. 5A and 5B are respective longitudinal sectional views of the upper and lower housing sections of the shut-off device of FIG. 2.
Figure 5B:
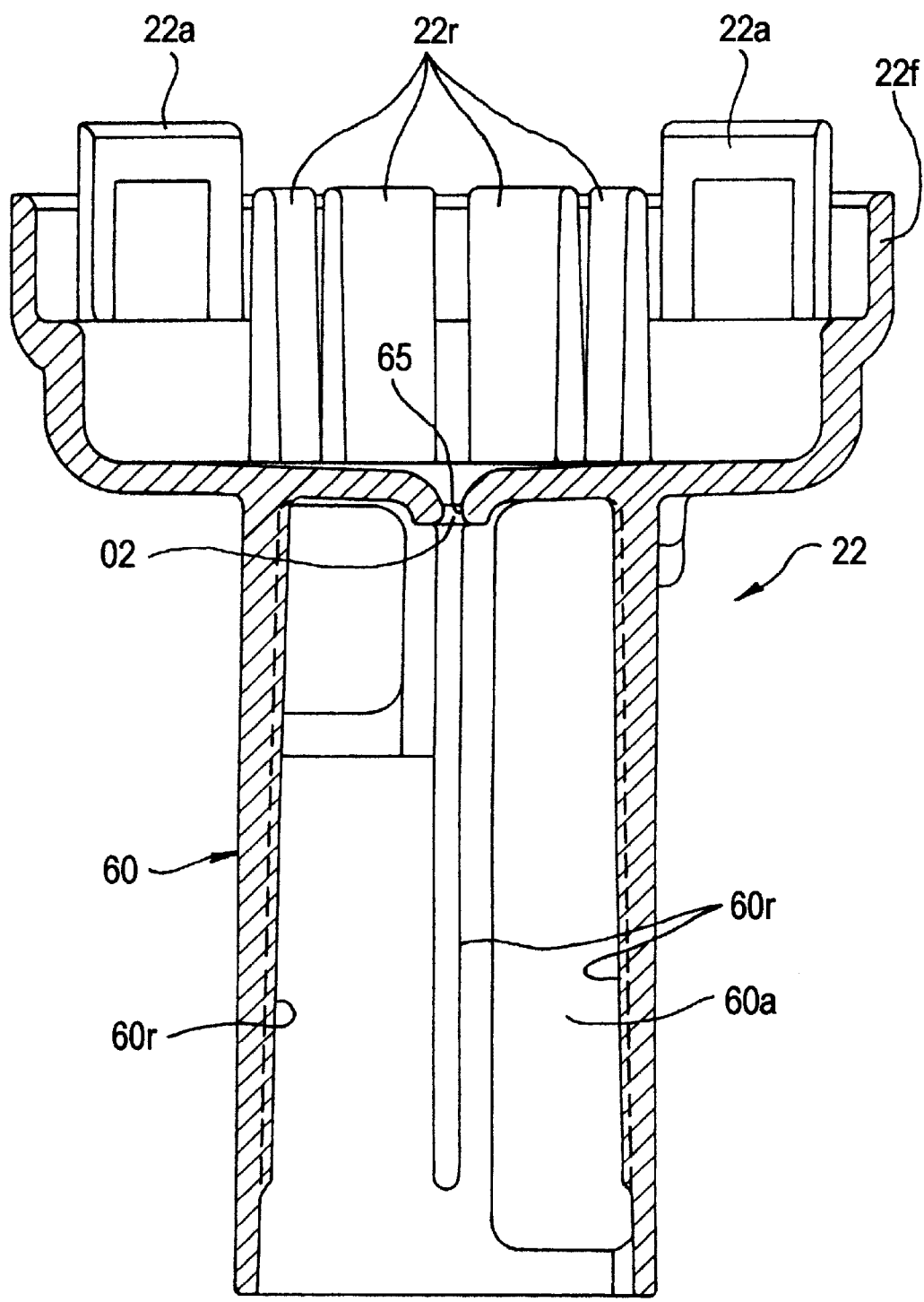

The lower housing 22, FIG. 5B, is molded to include an integral tubular sleeve 60 extending from the lateral orifice-defining wall 22w and that receives a plastic fuel float 62 for movement up and down in the sleeve 60 in response to the fuel level in the fuel tank T. The sleeve 60 includes diametrically opposite first and second slots 60a extending along the tubular sidewall of the sleeve to communicate to the interior of the fuel tank T. The fuel float 62 includes first and second diametrically opposite triangular fins 62a at the lower axial end that are received in respective slots 60a to retain float 62 in sleeve 60 and prevent rotation of the float in the sleeve 60. The sleeve also includes first and second upper openings 60b proximate the bottom wall of the housing 22 to provide a path for liquid fuel and fuel vapor flow.

The lower housing 22 includes the orifice O2 formed in the lateral wall 22w and defining a valve seat 65 for outlet orifice O2. The hollow fuel float 62 includes a hemispherical valve member 62v that is disposed on axial end wall 62b and is adapted to seal against the valve seat 65 when the level of the fuel in tank T reaches the predetermined "full" level. The axial end wall 62b is molded or connected to tubular float sleeve 62c.

The sleeve 60 includes a plurality (e.g. 4) of circumferentially spaced apart, axially extending ribs 60r for purposes of guiding axial movement of the float 62 in sleeve 60 in a manner that valve member 62v will seat properly on valve seat 65 when the fuel level is at the predetermined "full" level L in the tank T.

Sealing of the valve 62v of the float 62 on the valve seat 65 of outlet orifice O2 closes off communication between the chamber 50 and the fuel tank interior when the level of the fuel in tank T reaches the predetermined "full" level. The fuel float valve 62v thereby comprises a closure member for closing off communication of the chamber 50 to the fuel tank T when fuel level in the fuel tank reaches the predetermined "full" level L. When the fuel level in the fuel tank T is below the "full" level L during fueling, the valve 62v of the float 62 is disposed below and not sealed on the orifice valve seat 65, thereby opening the orifice O2 to permit communication of the chamber 50 to the fuel tank interior.

In operation, when fuel is being introduced through fuel fill pipe 12 to the fuel tank T with the fuel level below the predetermined "full" fuel level L, the chamber 50 is vented or communicated by inlet orifice O1 to fuel fill pipe 12 and by outlet orifice O2 to the interior of fuel tank T. The fluid pressure in chamber 50 is lower than the fluid pressure in the fuel fill piping 12 during fueling prior to reaching the predetermined fuel "full" level L as a result of venting of the tank to canister C so as to permit opening of the fuel shut-off valve 30 against bias of spring 34 by the liquid fuel introduced into the fuel fill pipe 12.

As the fuel level in the tank T rises during filling, the float 62 rises with the fuel level in the fuel tank T. When the fuel level reaches the predetermined "full" level L in the fuel tank T, the float 62 rises to dashed position UP where valve 62v of float 62 seals against valve seat 65 to close off orifice O2 to terminate communication of chamber 50 to the fuel tank T. With outlet orifice O2 closed, the fluid pressure in chamber 50 can build up by entry of liquid fuel through inlet orifice O1 until chamber fluid pressure approaches or generally equals the fluid pressure in the fuel fill pipe 12, thereby permitting movement of the shut-off valve 30 by the spring 34 as assisted by hydraulic fluid pressure on diaphragm 40 providing the aforementioned mechanical advantage toward valve seat 32 until closing of the shut-off valve 30 on seat 32 is achieved to prevent further filling the fuel tank with fuel. The fluid pressure in chamber 50 is attributable to presence of liquid fuel, fuel vapor, and any air in chamber 50. Control of the fuel "full" level in the fuel tank T thereby is controlled by physically blocking the fuel fill piping 12 with shut-off valve 30 to prevent further fuel flow into the tank. The reliance heretofore on closure of fuel vapor venting valves (e.g. rollover valve R, vapor vent valve V to a charcoal fuel vapor storage canister, etc.) on the top of the fuel tank T to control the fuel "full" level is eliminated. Pursuant to the invention, vapor venting valve V and rollover valve R may remain open when the fuel level in the fuel tank is at the design "full" level.

Referring to FIGS. 6, 7 and 8 where like features of FIGS. 1–5 are represented by like reference numerals primed, an alternative embodiment of the invention is illustrated where the shut-off device 10' is mounted in side S' of the fuel tank T' to accommodate a fuel fill piping 12' extending toward the side of the tank T' as shown in dashed lines in FIG. 1, rather than toward the top of the tank T as in the embodiment of FIGS. 1–5. The embodiment of FIGS. 6 and 7 differs primarily in that the fuel float 62' is oriented perpendicularly to the direction or axis of movement of the fuel shut-off valve 30' and that the lower housing 22' is reconfigured to accommodate this different orientation of the float 62'. For example, the housing 22' includes an additional secondary chamber 50a' that communicates chamber 50' to orifice O2'. The embodiment of FIGS. 6, 7 and 8 otherwise functions in the same manner described above to control the fuel "full" level in the fuel tank T.

Figure 9:
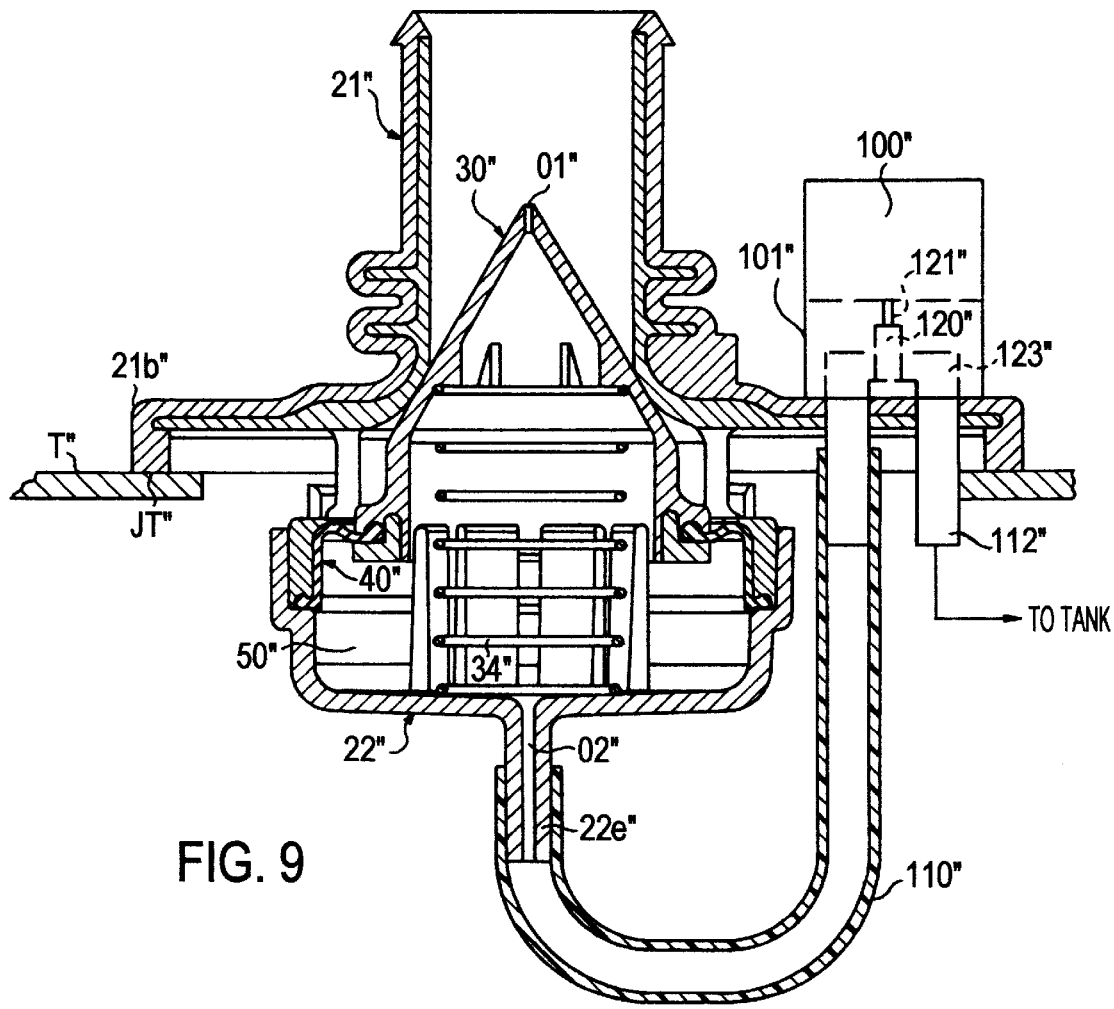
FIG. 9 is a longitudinal sectional view of another embodiment of the invention incorporating a solenoid actuated closure member.

Referring to FIG. 9 where like features of FIGS. 1–5 are represented by like reference numerals double primed, an alternative embodiment of the invention is illustrated where the float 62 is replaced by a latching or other solenoid 100" that is mounted on the fuel tank T". The outlet orifice O2" communicates to a hollow extension 22e" of housing 22" that receives and communicates to a conduit 110". The conduit 110" is communicated to a conduit 112" by a connector passage or port 123" in a solenoid housing 101". The conduit 112" communicates to the interior of the fuel tank T". The solenoid 100" can be actuated to move a valve member 120" on a solenoid armature 121" to block connector passage or port 123" to thereby close off the orifice O2" from communication with the interior of the fuel tank as the valve 62v on float 62 does in the embodiments of FIGS. 1–5. The solenoid 100" can be controlled using fuel level signals normally provided to the vehicle fuel gage by a conventional main fuel float (not shown) that resides in the fuel tank T" and that can provide a signal indicative of the fuel level in the tank reaching the design fuel "full" level. At that fuel "full" level, the solenoid 100" would be actuated to move armature 121" and thus valve 120" to close off passage or port 123", thereby closing off communication of orifice O2" to the interior of the fuel tank T" to prevent further filling of the fuel tank T" with fuel as described with respect to the embodiment of FIGS. 1–5. The solenoid actuated valve 120" would be withdrawn by solenoid 100" from passage or port 123" when the fuel level is below the design "full" level such that orifice O2" is communicated to the interior of the fuel tank. The embodiment of FIG. 9 otherwise operates in a similar manner as that of FIGS. 1–5.

Although components of the fuel pipe shut-off device of the invention are described as being made of various plastic or rubber materials, the invention is not so limited as other materials can be used. Certain components of the shut-off device are sectioned as metal in certain of the Figures for purposes of simplifying the Figures.

Moreover, although the invention has been shown and described with respect to certain embodiments, it should be understood by those skilled in the art that various changes, modifications in the form and detail thereof may be made therein without departing from the spirit and scope of the invention as set forth in the appended claims.

What is claimed is:

1. A vehicle fuel fill pipe shut-off device, comprising a valve housing adapted to be disposed on a side of a fuel tank and a fuel shut-off valve in said housing normally closed relative to a valve seat that is disposed in a path of fuel flow through a fuel fill pipe to said fuel tank, said valve being connected to a diaphragm in a manner to define in part a chamber communicated by a first orifice to said fuel fill pipe and by a second orifice to said fuel tank during fueling of said fuel tank below a predetermined fuel level, said valve being opened during said fueling by fuel introduced through said fuel fill pipe to said fuel tank, and a closure member for interrupting communication between said second orifice and said fuel tank when fuel level in said fuel tank reaches the predetermined fuel level to permit movement of said valve toward said valve seat and achieve closing of said valve to prevent further filling of said fuel tank with fuel, said closure member being connected to a fuel float disposed in an upstanding sleeve adapted to be disposed in said fuel tank and movable up and down in said sleeve in response to fuel level therein.

2. The device of claim 1 wherein said second orifice is larger in a dimension than said first orifice.

3. The device of claim 1 wherein said diaphragm and said valve define said chamber in a housing.

4. The device of claim 3 wherein said valve has a conical configuration with said diaphragm connected to a region of said conical configuration remote from an apex region thereof.

5. The device of claim 3 wherein said valve includes said first orifice and said housing includes said second orifice, said second orifice being larger than said first orifice.

6. The device of claim 1 wherein said valve is disposed on said diaphragm and is spring biased toward said valve seat to a normally closed position when fuel is not flowing in said fuel fill pipe.

7. The device of claim 6 wherein said diaphragm is dimensioned relative to a sealing surface of said valve to assist said spring in closing said valve after fuel level in said fuel tank reaches the predetermined level.

8. The combination on a motor vehicle of a fuel tank having a conduit for venting fuel vapor to a fuel vapor storage canister during fueling and the vehicle fuel fill pipe shut-off device as set forth in any one of claims 1–2, 3–5, and 6–7.

9. A method of controlling fuel level in a fuel tank of a motor vehicle when fuel is introduced through a fuel fill pipe to the fuel tank, comprising disposing a fuel fill shut-off valve in a valve housing disposed on a side of said fuel tank and normally closed relative to a valve seat in a path of fuel flow through said fuel fill pipe to said fuel tank, communicating a chamber defined in part by said valve and a diaphragm connected thereto to said fuel fill pipe and to said fuel tank during fueling of said tank below a predetermined fuel level with said valve being opened during said fueling by fuel introduced through said fuel fill pipe, and interrupting communication between said chamber and said fuel tank when said predetermined fuel level is reached to permit movement of said valve toward said valve seat and achieve closing of said valve to prevent further filling of said fuel tank with fuel.

10. The method of claim 9 wherein communication between said chamber and said fuel tank is interrupted by a valve on a float moving in an upstanding sleeve in said fuel tank in response to fuel level in said fuel tank.

11. The method of claim 9 wherein communication between said chamber and said fuel tank is interrupted by a solenoid actuated valve in response to fuel level in said fuel tank.

12. The method of claim 9 including normally closing said valve by spring biasing said valve toward the valve seat when there is no fuel flow.

13. The method of claim 12 wherein said diaphragm assists said spring in closing said valve after said predetermined fuel level is reached.

14. The method of claim 9 including venting fuel vapor from the fuel tank during fueling.

* * * * *

UNITED STATES PATENT AND TRADEMARK OFFICE
CERTIFICATE OF CORRECTION

PATENT NO. : 6,257,287 B1  
DATED : July 10, 2001  
INVENTOR(S) : Bradley N. Kippe et al.

It is certified that error appears in the above-identified patent and that said Letters Patent is hereby corrected as shown below:

Column 7,  
Lines 21 and 22, replace "3-5, and 6-7" with -- 5-7, and 9-10 --.

Signed and Sealed this

Twenty-sixth Day of March, 2002

Attest:

Attesting Officer

JAMES E. ROGAN  
*Director of the United States Patent and Trademark Office*